United States Patent [19]
Vermilion et al.

[11] Patent Number: 6,130,276
[45] Date of Patent: Oct. 10, 2000

[54] METHOD OF REDUCING FUMES FROM A VESSEL OF MOLTEN ASPHALT

[75] Inventors: Donn Roy Vermilion, Newark, Ohio; Michael Richard Franzen, Lombard, Ill.; Richard T. Janicki, Oak Lawn, Ill.; David Charles Trumbore, LaGrange, Ill.; Jay W. Keating, Tinley Park, Ill.; Jorge Alberto Marzari, Bolingbrook, Ill.

[73] Assignee: Owens Corning Fiberglas Technology, Inc., Summit, Ill.

[21] Appl. No.: 09/266,972

[22] Filed: Mar. 12, 1999

Related U.S. Application Data

[63] Continuation-in-part of application No. 08/940,550, Sep. 30, 1997, which is a continuation of application No. 08/657,831, May 31, 1996, Pat. No. 5,733,616, said application No. 08/657,831, is a continuation-in-part of application No. 08/484,758, Jun. 7, 1995, abandoned, and a continuation-in-part of application No. 08/606,320, Feb. 23, 1996, abandoned, and a continuation-in-part of application No. 08/606,321, Feb. 23, 1996, abandoned, said application No. 08/606,320, said application No. 08/606,321, is a continuation-in-part of application No. 08/484,758, which is a continuation-in-part of application No. 08/990,012, Dec. 12, 1997.

[51] Int. Cl.⁷ .............................. C08L 95/00; B32B 11/00
[52] U.S. Cl. .............................. 524/69; 524/59; 524/70; 524/71; 206/524.7; 206/525; 428/35.7; 428/36.8; 428/489
[58] Field of Search .................. 524/59, 68, 69, 524/70, 71; 206/447, 524.7, 525; 428/35.7, 36.8, 489

[56] References Cited

U.S. PATENT DOCUMENTS

| 5,452,800 | 9/1995 | Muir .................................. 206/524.7 |
| 5,733,616 | 3/1998 | Zenicki et al. ..................... 206/524.7 |

*Primary Examiner*—Peter A. Szekely
*Attorney, Agent, or Firm*—Inger H. Eckert; James J. Dottavio

[57] ABSTRACT

In a method of melting asphalt in a vessel, the molten asphalt normally emitting fumes, 0.2 weight percent to 6 weight percent of a polymer is added to the asphalt to reduce the visual opacity of the fumes by at least 25% over the same asphalt without the polymer. In another embodiment, the total emissions of benzene soluble suspended particulates is reduced by at least 15% over the same asphalt without the polymer. Preferably, the added polymer has a melt flow index of from 15 grams/10 minutes to 95 grams/10 minutes, and the added polymer reduces the visual opacity of the fumes by forming a skim on the upper surface of the molten asphalt.

28 Claims, 4 Drawing Sheets

METHOD OF REDUCING FUMES FROM A VESSEL OF MOLTEN ASPHALT

CROSS-REFERENCE TO RELATED APPLICATIONS

This application is a continuation-in-part of copending Ser. No. 08/940,550 to Vermilion et al., filed Sep. 30, 1997; which is a continuation of Ser. No. 08/657,831 to Janicki et al., filed May 31, 1996, now U.S. Pat. No. 5,733,616. Said Ser. No. 08/657,831 is a continuation-in-part of Ser. No. 08/484,758 to Janicki et al., filed Jun. 7, 1995, now abandoned, and a continuation-in-part of Ser. No. 08/606,320 to Vermilion et al., filed Feb. 23, 1996, now abandoned, and a continuation-in-part of Ser. No. 08/606,321 to Harris et al., filed Feb. 23, 1996, now abandoned. Said Ser. Nos. 08/606,320 and 08/606,321 are both continuation-in-parts of said Ser. No. 08/484,758. This application is also a continuation-in-part of copending Ser. No. 08/990,012 to Franzen et al., filed Dec. 12, 1997.

TECHNICAL FIELD AND INDUSTRIAL APPLICABILITY OF THE INVENTION

This invention relates in general to asphalt materials for use in roofing, paving and other applications. More particularly, this invention relates to a method of reducing fumes emitted from a vessel of the molten asphalt. The invention can be useful for providing asphalt for use in locations where fumes from the molten asphalt are a concern.

BACKGROUND OF THE INVENTION

Asphalt from processing and terminalling facilities is transported to end users in one of several ways, including direct piping of molten asphalt to nearby customers, shipping in molten form via tanker truck, railcar and barge, and shipping in solid form in individual packages. The packages are used primarily by building contractors as a source of asphalt for roofing applications. The contractor typically places the solid asphalt in a heated kettle to melt the asphalt for use. Asphalt shipped in molten form is also usually further heated in a kettle prior to use.

A problem associated with such heated kettles of molten asphalt is that they can emit significant amounts of fumes. The fumes can be unsightly, and an irritant to workers and others in the surrounding area. Accordingly, it would be desirable to reduce the amount of fumes normally emitted from a kettle or other vessel of molten asphalt.

It would also be desirable to reduce fuming and odors without substantial modification of the processed or raw asphalt. By contrast with known polymer-modified asphalt compositions, which are highly modified materials where the polymer is used, e.g., to impart elongation properties, an asphalt without such modification is desired for many applications.

It would also be desirable to reduce fuming and odors of molten asphalt while permitting for convenient, user-tailorable enhancement or alteration of the asphalt properties.

Furthermore, it would be desirable to produce a low-fuming asphalt in a convenient package. Individual packages of asphalt are typically formed at conventional asphalt processing facilities by pouring molten asphalt into containers made of a metal bottom and paper cylindrical sidewalls. The asphalt is typically poured at temperatures of about 177° C. and the packages are allowed to cool for up to 24 hours prior to shipping.

A problem with existing asphalt packages is that removal of the paper and metal container from the solid asphalt is time-consuming. The disposal of the paper and metal container material is also burdensome. Therefore, it would be desirable to be able to package asphalt in individual packages and yet eliminate the need to remove the container or to dispose of the container. In particular, it would be desirable to provide a container for asphalt that is consumable so that it can be melted right along with the asphalt.

SUMMARY OF THE INVENTION

The above objects as well as other objects not specifically enumerated are achieved by a method of melting asphalt in which an amount of unmelted asphalt is placed into a vessel and heated to melt the asphalt, the molten asphalt normally emitting fumes from the vessel, the improvement comprising: adding about 0.2 weight percent to about 6 weight percent of a polymer to the asphalt to reduce the visual opacity of the fumes by at least about 25% over the same asphalt without the polymer. In another embodiment, the total emissions of benzene soluble suspended particulates is reduced by at least about 15% over the same asphalt without the polymer. Preferably, the added polymer has a melt flow index of from about 15 grams/10 minutes to about 95 grams/10 minutes, and the added polymer reduces the visual opacity of the fumes by forming a skim on the upper surface of the molten asphalt.

In another embodiment of the invention there is provided a method of holding asphalt in which an amount of molten asphalt is contained in a vessel, the molten asphalt normally emitting fumes from the vessel, the improvement comprising: adding about 0.2 weight percent to about 6 weight percent of a polymer to the asphalt to reduce the visual opacity of the fumes by at least about 25% with respect to the same asphalt without the polymer. The asphalt can be added to the vessel in either solidified form or molten form.

DETAILED DESCRIPTION AND PREFERRED EMBODIMENTS OF THE INVENTION

Figure 1:
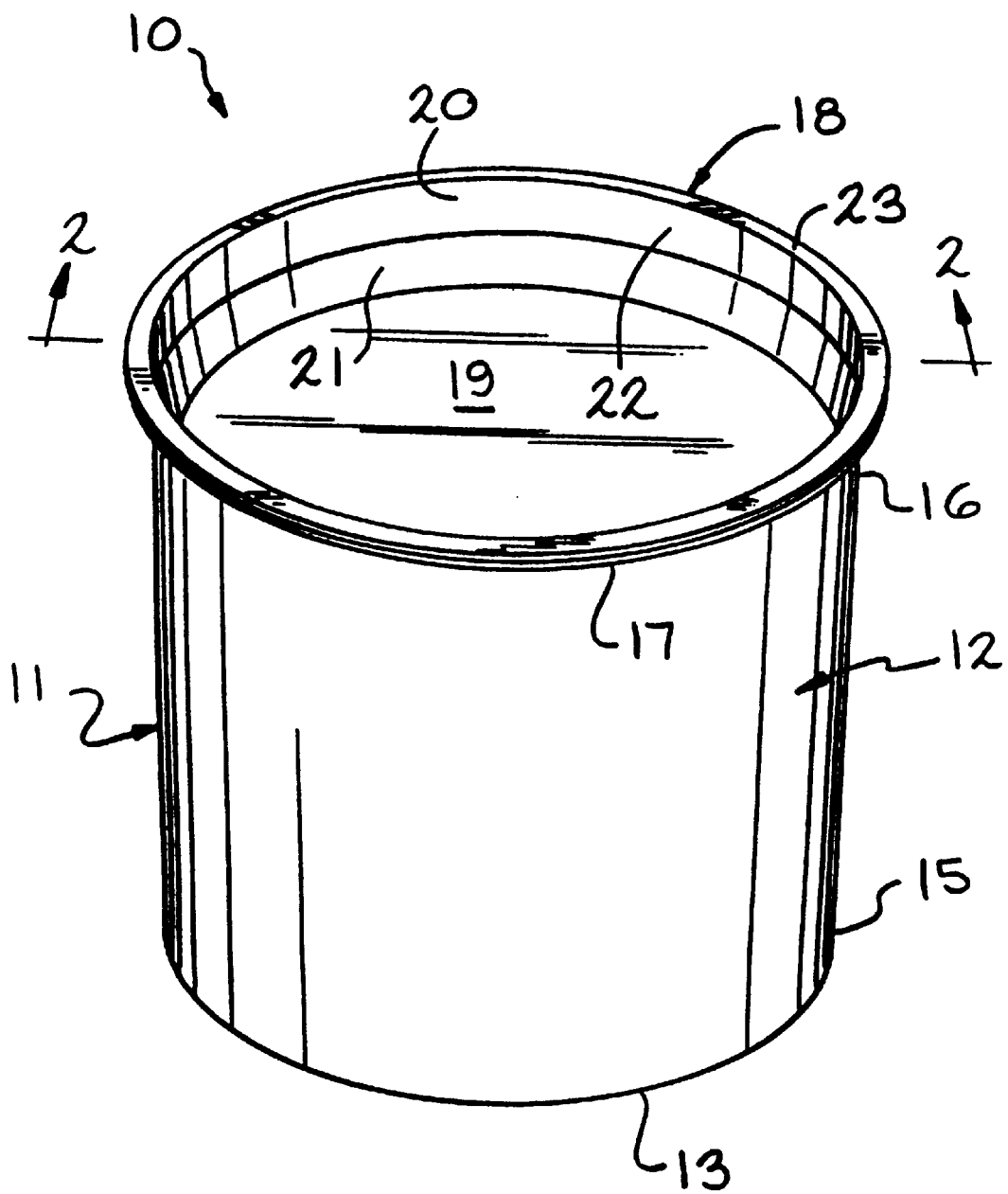
FIG. 1 is a schematic view in perspective of one embodiment of an asphalt package, which includes a consumable container filled with asphalt, useful for reducing fumes and odors from a vessel of the molten asphalt in accordance with the invention.

Advantageously, it has been found that the addition of a minor amount of a polymer to asphalt helps to reduce fumes emitted from a vessel of the molten asphalt. The term "vessel" means any kettle, container or other receptacle suitable for holding molten asphalt, such as a roofer's kettle, an asphalt package, a bulk storage tank, a tanker truck, a railcar or a barge. While the asphalt is being held in the vessel, it may be held for heating, storing, transporting or dispensing. The asphalt contained in the vessel can be placed in the vessel in molten form, or alternatively it can be placed in the vessel in a solid form and then melted. The polymer material can be added to the vessel when the asphalt is added to the vessel, or it can be added later. The polymer material can be added to the vessel before the asphalt is melted, or can be added to asphalt that is already molten. The polymer material can be added in either solid or liquid form. When the added polymer melts, some of the polymer rises to the upper surface of the molten asphalt in the vessel to form a skim thereon that reduces fuming. The term "skim" means a layer, film, or coating which floats, forms, or collects on the upper surface of the molten asphalt. Preferably, the polymer forms a skim across at least about 80–90% of the upper surface of the molten asphalt, and more preferably across substantially the entire upper surface of the molten asphalt. It is understood that when additional asphalt is placed into the vessel, the skim may be broken but it usually quickly re-forms over the surface.

While not intending to be limited by theory, it is believed that the skim reduces fuming from the vessel by acting as a cool top or barrier to exposure of the molten asphalt to air. The thickness of the skim is a function of the addition rate of polymer minus the polymer's dissolution rate. The dissolution rate is a function of fundamental polymer properties as well as vessel temperature and agitation level. The thickness of the skim is usually from about 3 mm to about 13 mm, and typically about 6 mm. However, it is believed that a skim thickness of at least about 0.025 mm, more preferably at least about 0.25 mm, is suitable for reducing fuming from the vessel.

The inclusion of polymers to form such skims may advantageously be used with any asphalt product that is generally heated in an open kettle in preparation for its use. As used herein the term "asphalt" is meant to include asphalt bottoms from petroleum refineries, as well as naturally occurring bituminous materials such as asphalts, gilsonite, tars, and pitches, or these same materials that have been air-blown or otherwise chemically processed or treated. For example, the asphalt can be air-blown with catalysts such as ferric chloride and the like. The asphalt can be a conventional roofing flux asphalt or a paving-grade asphalt, as well as other types of asphalts, including specialty asphalts such as water-proofing asphalts, battery compounds, and sealers. Blends of different kinds of asphalt can also be used.

The polymer added to the asphalt can be any polymer capable of melting and forming a skim of sufficient viscosity on the upper surface of the molten asphalt to reduce fuming from the kettle. The polymer should have a relative density lower than that of the asphalt so that it rises to the upper surface of a kettle of the molten asphalt, and should be miscible and compatible with the asphalt.

Exemplary polymers that may be used include polyolefin polymers such as polypropylene, ethylene-propylene copolymers, and butylene copolymers; ethylene-vinylacetate copolymers; copolymers of acrylates and methacrylates, such as butyl, propyl, ethyl, or methyl acrylate or methacrylate copolymerized with ethylene, propylene, or butylene; epoxy-functionalized copolymers such as a terpolymer of ethylene, butyl acrylate and glycidyl methacrylate, available from E.I. duPont de Nemours & Co. (Wilmington, Del.) as Elvaloy® AM; and synthetic rubber such as styrene-butadiene-styrene (SBS), styrene-butadiene rubber (SBR), styrene-ethylene-butylene-styrene (SEBS), or terpolymer made from ethylene-propylene diene monomer (EPDM); and mixtures thereof. Preferably, the polymer is selected from polypropylenes, ethylene-propylene copolymers, ethylene-vinyl acetate copolymers (EVA), ethylene-methyl acrylate copolymers (EMA), synthetic rubbers, and mixtures thereof Particularly preferred are ethylene-methyl acrylate copolymers and ethylene-vinyl acetate copolymers. Useful ethylene-vinyl acetate copolymers preferably have a vinyl acetate content from about 5% to about 40% by weight, more preferably from about 9% to about 28% by weight, so that they are suitably soluble in the asphalt. Preferred ethylene-vinyl acetate copolymers include the Elvax® series from duPont, such as Elvax 360 through 750, preferably Elvax 450 or 470. Ethylene-vinyl acetate copolymers are also available from USI Chemicals under the trade names Ultrathene® and Vynathene®.

The skim is preferably viscous enough so that it stays together as a continuous layer to reduce fuming from the vessel. If the viscosity of the skim is too low, fumes from the molten asphalt could break up through holes in the skim and escape from the vessel. In contrast, if the viscosity is too high, the polymer will not easily form a continuous skim over the entire exposed surface of the asphalt, nor redisperse or dissolve easily into the bulk asphalt over time. To provide a preferred viscosity, the added polymer preferably has a melt flow index of from about 15 to about 95 grams/10 minutes, more preferably from about 25 to about 85 grams/10 minutes, and even more preferably from about 35 to about 75 grams/10 minutes. A lower melt flow index generally indicates a more viscous polymer. The melt flow index is measured at 190° C. under a 2.16 kg load according to ASTM D1238 Method B.

Although a wide range of polymeric materials are useful in the invention, the polymer selected for use with a particular asphalt should not undesirably modify the properties of the asphalt in the amount added. For example, where the asphalt is intended to be used as a roofing asphalt, it is preferred that both the asphalt without (before addition of) the polymer, and with the polymer, meets the requirements for at least one type of roofing asphalt according to ASTM D312, more particularly ASTM D312-89. Accordingly, it is preferred that the addition of the polymer to the asphalt reduces fuming but does not significantly change the properties of the asphalt. More preferably, the asphalt with the added polymer meets the following ASTM D312 specifications for a Type III roofing asphalt: softening point (by ASTM D36) of 85–96° C.; flash point of 246° C. minimum; penetration (by ASTM D5) at 0° C. of 6 dmm minimum, at 25° C. of 15–35 dmm, and at 46° C. of 90 dmm maximum; ductility (by ASTM D-113) at 25° C. of 2.5 cm minimum; and solubility (by ASTM D2042) in trichloroethylene of at least 99%. Preferably the addition of the polymer to the asphalt does not change the softening point of the asphalt by more than about 9° C., more preferably not more than about 3° C., and does not change the penetration of the asphalt by more than about 10 dmm at 25° C.

Further, in some instances, the polymer chosen for use with a particular asphalt, and the amount added, may be selected to enhance the physical properties of the resulting composition. For example, the polymer selected for use with cold-flowable paving asphalts may advantageously be selected to enhance the properties of such asphalts, such as their high-temperature performance as measured by, e.g., the Federal Highway Association's pending Strategic Highway Research Program (SHRP) specification. Exemplary polymers for improving asphalt paving properties include ethylene-vinylacetate copolymers, styrene-butadiene-styrene rubber, polypropylene, and ethylene-methylacrylate copolymers.

The polymer is typically added to the asphalt in an amount sufficient to reduce the visual opacity of the fumes from the vessel by at least about 25% with respect to the same asphalt without the polymer. The visual opacity of the fumes is a measure of the blockage of natural light by the fumes. The more fumes emitted from the vessel, the higher the visual opacity. Conversely, a reduction in the visual opacity indicates a reduction in the amount of fumes emitted from the vessel. Preferably, the polymer is added in an amount sufficient to reduce the visual opacity of the fumes by at least about 35%, more preferably at least about 50–60%, and even more preferably at least about 70–80%.

The reduction in visual opacity of the fumes increases at higher temperatures where fuming is at its worst with conventional asphalt products. Kettles of roofing asphalt are typically heated to temperatures of from about 232° C. to about 288° C. Preferably the added polymer reduces the visual opacity of the fumes by at least about 35% at 260° C., and more preferably at least about 50% at 260° C.

Further, the total emissions of benzene soluble suspended particulates from the vessel is typically reduced by at least about 15% over the same asphalt without the polymer. Preferably the total is reduced by at least about 25%, more preferably at least about 40–50%, and even more preferably at least about 60–70%. The total benzene soluble suspended particulate emissions is made up of the small particles of benzene soluble solid materials present in the fumes, so that a reduction in such particulate emissions indicates a reduction in the amount of fumes emitted. Preferably the total suspended particulates emissions is reduced by at least about 25% at 260° C., and more preferably at least about 50% at 260° C.

To provide a polymer skim to achieve such reductions in fuming, the concentration of polymer is preferably sufficient to form a skim over the entire exposed surface of the asphalt in the vessel. Preferably, the amount of polymer added is within the range of from about 0.2% to about 6% by weight based on the total weight of the asphalt and polymer. More preferably, from about 0.2% to about 2%, and even more preferably, from about 0.3% to about 0.5% polymer is added based on the total weight of asphalt and polymer. At such levels, the amount of fumes normally emitted from a vessel of the molten asphalt is significantly reduced without any significant modification of the asphalt properties.

The polymer can generally be added to the asphalt in almost any manner to reduce fuming. The polymer can be added to the asphalt before it is transported to the end user, or the polymer can be added to the asphalt by the end user. The end user can add the polymer directly to the vessel of molten asphalt. The polymer can be added to the asphalt in liquid form or in solid form, e.g., in the form of pellets, granules, flakes, particles, powders, or other formed shapes (hereinafter collectively referred to as "pellets"). Addition may also come in any of the above forms encapsulated or otherwise contained in a polymeric bag, which can be added easily to any asphalt vessel. When the polymeric bag is added to molten asphalt, the bag melts releasing the contained polymer and the polymeric material of the bag.

The polymer can be added to the asphalt neat, but preferably the polymer is added to the asphalt in the form of a mixture of polymer and asphalt, more preferably a solidified mixture such as polymer/asphalt composite pellets. Such polymer/asphalt mixtures typically provide better reductions in hydrocarbon emissions than skims resulting from the melting of pure polymer, and the presence of the asphalt with the polymer aids in the melting of the polymer and increases its dispersibility. Preferred polymer/asphalt mixtures, e.g., polymer/asphalt composite pellets, may contain from about 30% to about 90% by weight polymer and from about 10% to about 70% asphalt. Preferably, such mixtures contain from about 40% to about 80% polymer. More preferably, such mixtures comprise from about 20% to about 60% asphalt and from about 40% to about 80% polypropylene.

Suitable polymer/asphalt composite pellets may be formed by co-extruding the asphalt and polymer through a heated extruder wherein the materials are heated above their softening points and blended together, such as occurs in conventional extruders, and then forming the moldable mixture into pellets. Accordingly, the polymers used for providing the skim and the asphalts preferably have melting points and viscosities that are suitable for coextrusion. Preferred asphalts generally have a ring and ball softening point higher than about 90° C. measured according to ASTM D36. It is not necessary that the asphalt component of the pellets be the same as the molten asphalt in the vessel. Suitable asphalts include air-blown roofing flux and air-blown paving-grade asphalt in the range of from AC-2 to AC-50, more preferably AC-10 or AC-20.

Optionally, non-polymeric chemical modifiers and additives, such as a synthetic wax, may be added to the pellet composition. This feature advantageously permits the use of one or a few standard asphalts to fill the vessel, with the desired chemical additives for optimizing the asphalt for the intended application being added to the asphalt via the pellets.

Additionally, one or more filler materials, such as crushed stone, glass fibers, talc, calcium carbonate, or silica, may be added to the pellet formulation if desired. However, such filler materials would be undesirable in some end uses of the asphalt and are not generally preferred. Accordingly, it is to be understood that the filler materials are to be ignored when calculating the percentages of other specified materials in the asphalt; thus, the weight percentages of ingredients given herein are based on total weights of the materials or compositions exclusive of any filler or the like present in the material or composition.

Polymer pellets or asphalt/polymer composite pellets may be of any conveniently formed size and geometric configuration that will exhibit suitable melting and/or dissolution rates. Generally, the rate of melting and dissolution increases as the ratio of surface area to mass increases. Consequently, to obtain the maximum benefit from the polymer, it may be preferred to maximize the mass of the pellet and minimize the surface area to slow the rate of dissolution of the polymer into the molten asphalt. Further, pellets having a size and shape that exhibit good flowability can be advantageous in automated processing equipment. For these reasons, spherical pellets having a diameter of from about 1.59 mm (1/16 inch) to about 6.35 mm (1/4 inch), and cylindrical pellets having a comparable diameter and length of from about 1.59 mm (1/16 inch) to about 12.70 mm (1/2 inch) are generally preferred.

In a preferred embodiment of the invention, the polymer is added to the asphalt and the mixture is formed into a consumable container for the asphalt. The container comprises, by weight, from about 40% to about 90% asphalt and from about 10% to about 60% polymer. The container is consumable so that it can be melted along with the asphalt held in the container without requiring undue mixing. For a roofing asphalt package, the container preferably does not significantly change the properties of the asphalt (as described above for the addition of the polymer to the asphalt). Thus, the consumable container overcomes problems associated with conventional paper and metal containers. Further, the added polymer reinforces the container as well as reduces fuming from the kettle. Consumable containers of asphalt can be added to a roofer's kettle throughout the day as needed to supply more asphalt for roofing, for example at intervals of 30 minutes to one hour.

Figure 2:
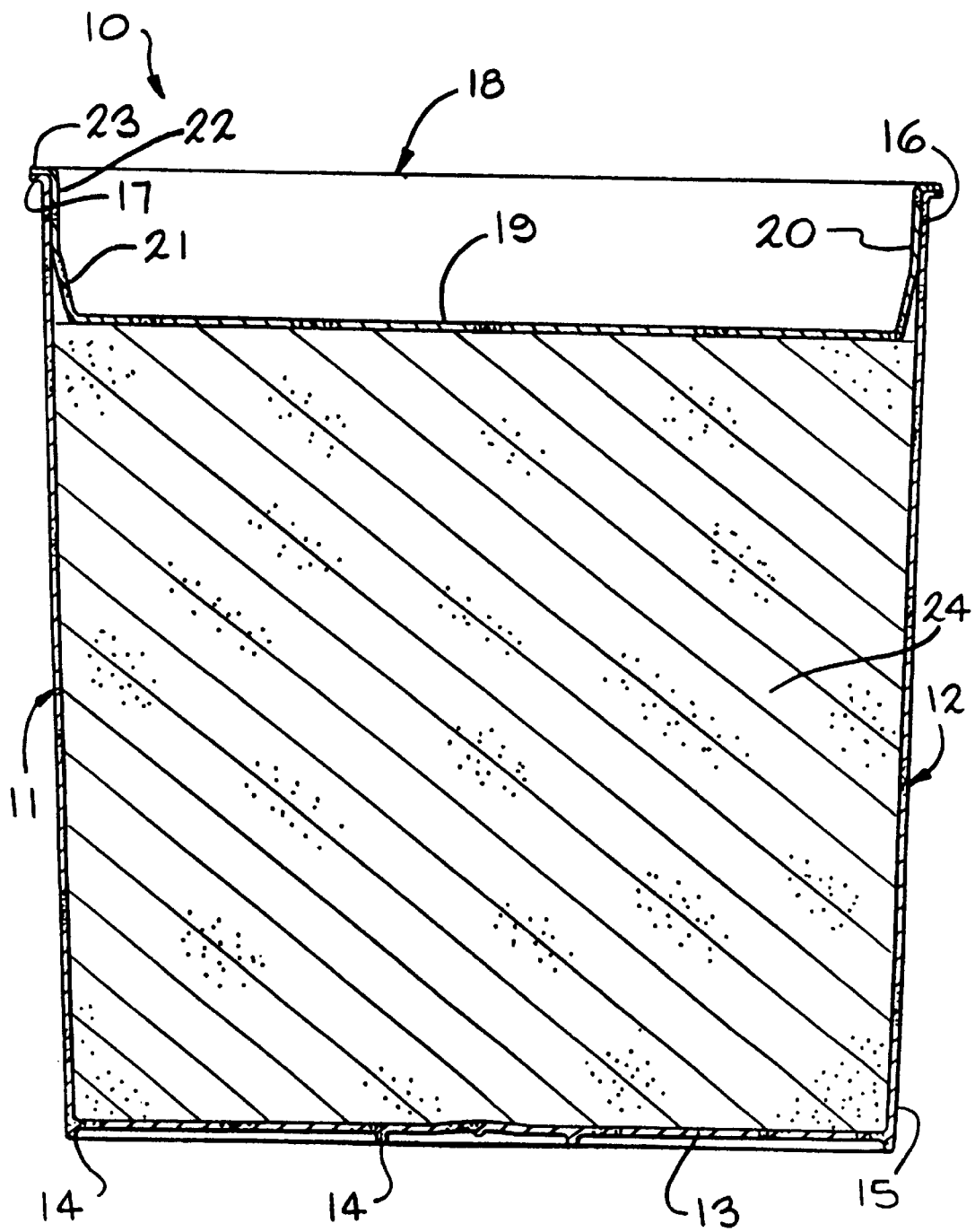
FIG. 2 is a cross-sectional view of the consumable container taken along line 2—2 of FIG. 1.

Referring now to a preferred embodiment of a consumable container for asphalt shown in the drawings, there is illustrated in FIGS. 1 and 2 a consumable container 10. In the illustrated embodiment, the container is generally cylindrical in shape, having an open end and a closed end. However, the container may be any other convenient shape, such as a rectangular solid shape. Although rectangular solid shapes may provide efficiencies in shipping and storing, these advantages may be outweighed by the advantage of providing containers separable by a substantial distance during the pouring process in order to facilitate rapid cooling.

The illustrated embodiment of a consumable container 10 includes a receptacle 11 for holding asphalt. The receptacle has a cylindrical sidewall 12 and a circular base 13 defining a closed end. A pair of concentric, annular protrusions 14 extend downward from the base a short distance. The protrusions can increase the dimensional stability of the container. The sidewall includes a lower end 15 adjacent to the base and an upper end 16 a distance from the base. As shown in FIG. 1, preferably the diameter of the upper end of the sidewall is larger than the diameter of the lower end. This structure provides the ability to easily stack one container on top of another container, as will be described below. In a preferred embodiment, the diameter of the sidewall is 35.6 cm at the upper end and 31.8 cm at the lower end. Preferably the container is molded with a tapered sidewall, having a lower sidewall which is thicker than the upper sidewall, to increase the strength of the container. In the illustrated embodiment, the sidewall has a thickness of 0.20 cm at the lower end and 0.17 cm at the upper end. The receptacle is about 38.1 cm high. An annular flange 17 extends outward from the upper end of the sidewall a short distance, preferably about 0.64 cm.

The container 10 further includes a lid 18 which is generally circular in shape. The lid includes a circular cover 19 and a generally cylindrical skirt 20 which extends upward from the perimeter of the cover. The skirt includes a lower portion 21 which angles outwardly from the cover, and an upper portion 22 which angles very slightly outwardly from the lower portion. The outer diameter of the upper portion of the skirt is substantially the same as the inner diameter of the upper end of the receptacle, so that the lid can be received and tightly secured within the upper end of the receptacle. The lid also includes an annular flange 23 which extends outwardly from the skirt portion a short distance. The receptacle is filled with asphalt 24. Then the lid is positioned on the receptacle to close the container, with the flange of the lid engaging the flange of the receptacle.

Figure 3:
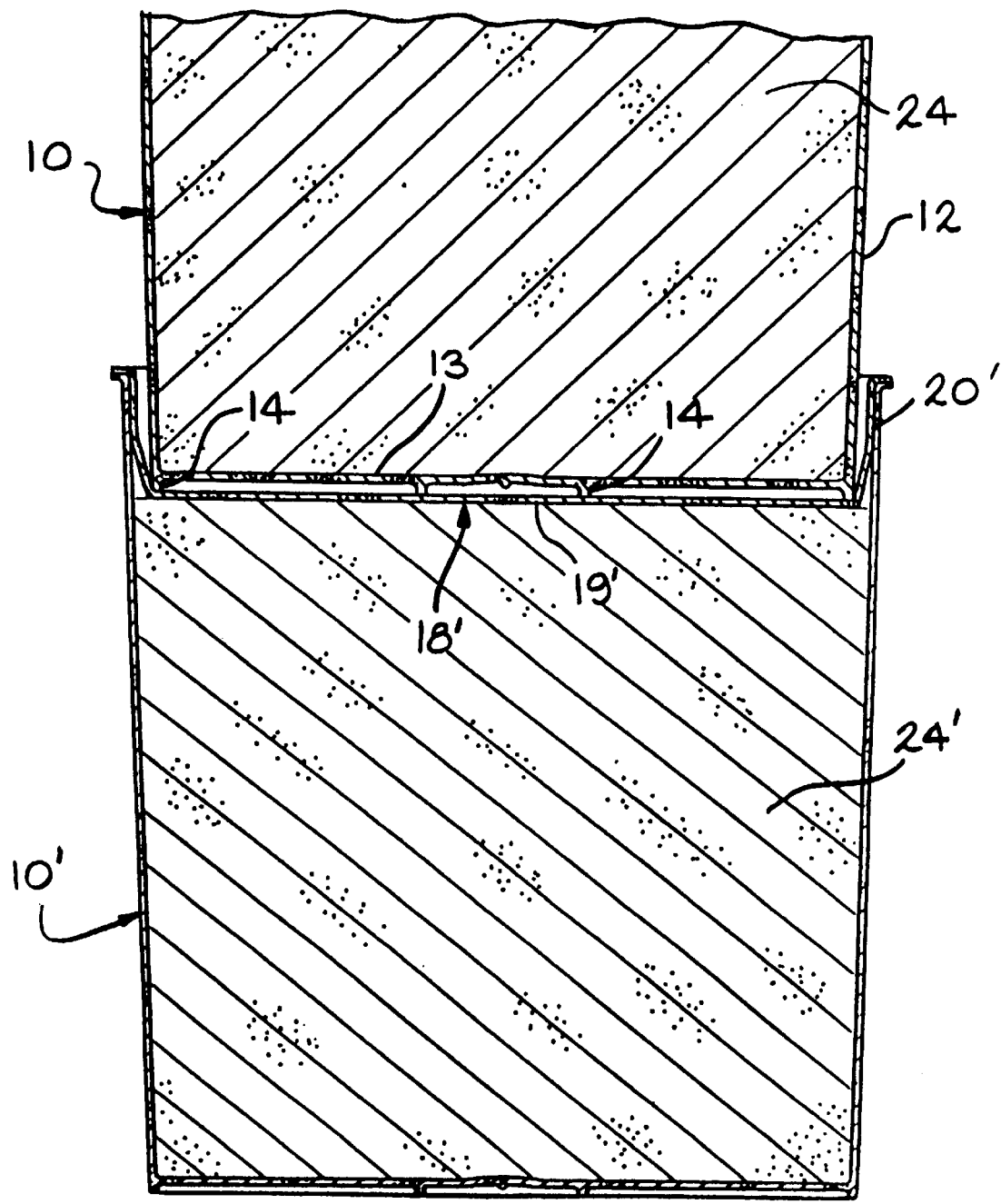
FIG. 3 is a cross-sectional view of a pair of consumable containers of asphalt, with one of the containers stacked on top of the other.

Referring to FIG. 3, it can be seen that the preferred container has a structure that enables a first container 10 to be stacked on top of a second container 10' to reduce shipping and storage costs. The base 13 of the first container is positioned inside the lid 18' of the second container. The sidewall 12 of the first container fits inside the skirt 20' of the lid of the second container. Preferably, concentric annular protrusions 14 of the first container rest on the circular cover 19' of the second container, which is shown filled with asphalt 24' to form an asphalt package.

The container has a composition, by weight, of from about 40% to about 90% asphalt and from about 10% to about 60% polymer, more preferably from about 55% to about 75% asphalt and from about 25% to about 45% polymer. It is preferred to use a high proportion of asphalt in the composition of the container for roofing asphalt because of the lower cost of asphalt relative to the cost of the polymer. Also, a higher percentage of asphalt gives rise to a greater compatibility with the asphalt in the container.

The container should have a sufficiently high softening point to withstand the high temperatures associated with molten asphalt, and with shipping and storage, without softening. Preferably the composition of the container has a ring and ball softening point higher than about 107° C., more preferably higher than about 125° C., and even more preferably higher than about 149° C. The ring and ball softening point may be measured by ASTM D36.

The container can be formed by any convenient process. For example, the sidewall of the receptacle can be bonded to the base. However, preferably the container is formed as an integral or unitary structure by a molding process such as injection molding, blow molding, or rotation molding.

An injection molding process is particularly preferred. As known to persons skilled in the art, an injection molding process usually involves the use of a screw and heated barrel assembly to heat-soften the composition to be molded. The heat-softened composition is then injected into a closed mold, usually by the action of the screw moving forward. The composition cools and solidifies, taking the shape of the mold cavity.

Molding processes offer advantages in costs, design flexibility, and features that can be incorporated into the container. The molding process enables a variety of features to be easily incorporated in the container as desired. For example, the molding process can be used to mold an embossment on the receptacle or lid for such purposes as labeling, instructions, or marketing logos. Preferably, the lid of the container is labeled with the type of asphalt held by the container.

The container can also be adapted with handholds, which can be molded into the container to facilitate handling. Further, ribs can be molded in the container to increase its strength during the pouring phase of the packaging. In a preferred embodiment, one or more circumferential ribs are provided on the outer surface of the receptacle wall, which will remain cooler than the wall during pouring and thereby provide dimensional stability to the container. Also, the container can have one or more recesses which quicken the remelting process by enabling hot asphalt in the kettle to penetrate to interior portions of the asphalt package. The recesses also speed up the cooling process after the molten asphalt is poured into the container.

Figure 5:
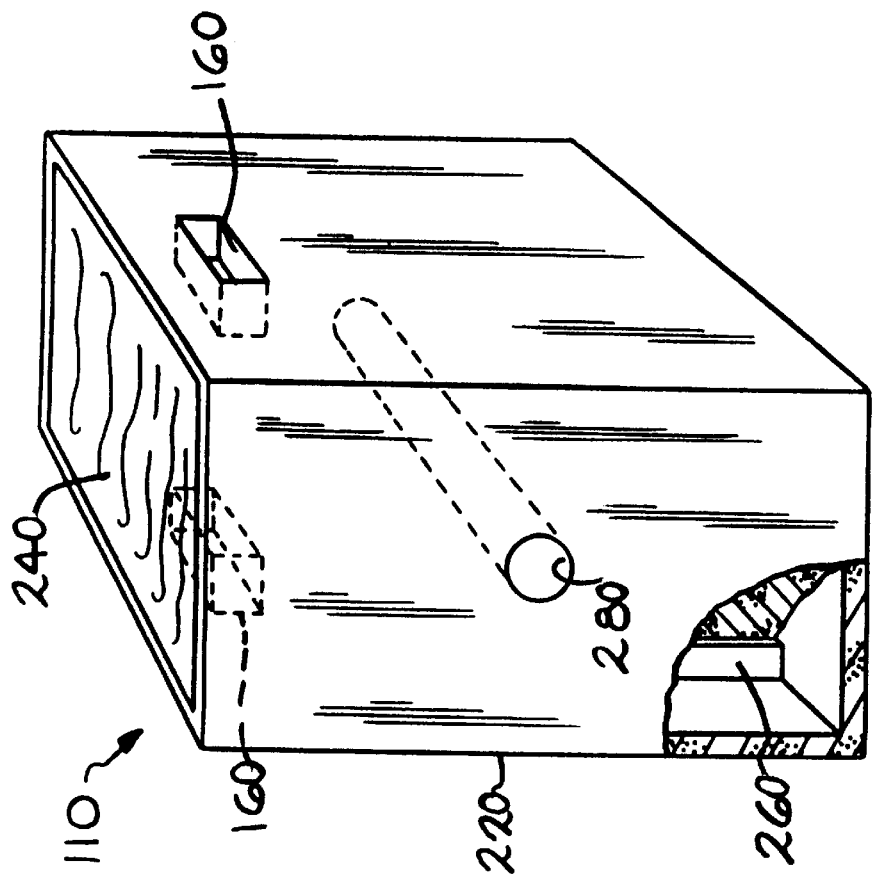
FIG. 5 is a schematic view of an embodiment of an asphalt package of the invention.
Figure 4:
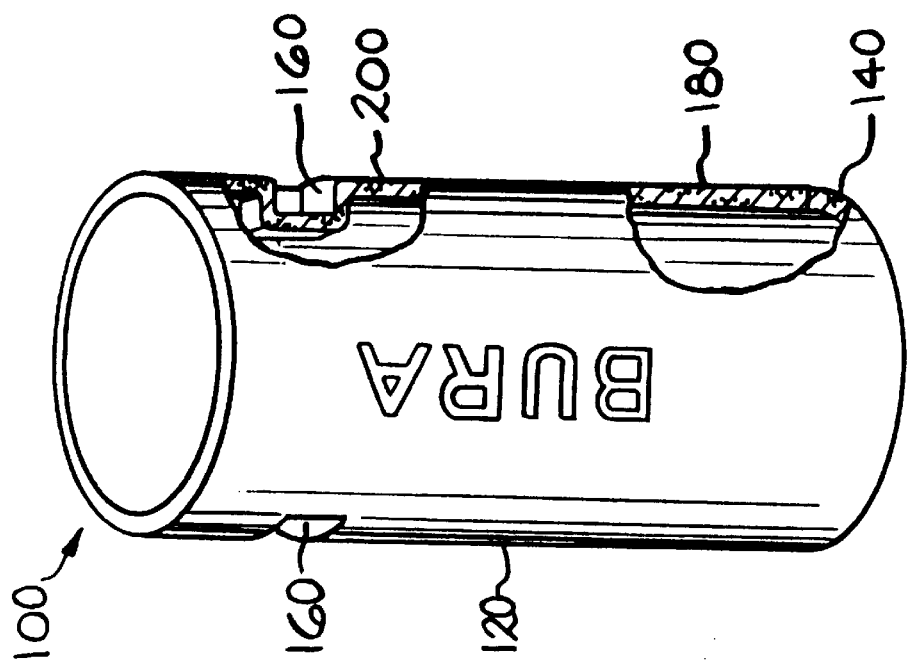
FIG. 4 is a schematic view in perspective of another embodiment of a container for an asphalt package of the invention.

An alternate embodiment of a container and asphalt package is shown in FIGS. 4 and 5. Referring to FIG. 4, container 100 is formed in a suitable manner, e.g., by a molding process such as injection, blow, or rotation molding. The container may also be formed by bonding sidewall 120 to a base or bottom 140.

The container 100 may be provided with handholds 160, which can be molded into the container to facilitate handling. To increase the strength of the container to withstand the stress of being filled with molten asphalt during filling, the container can be made with a tapered sidewall 120, having a lower sidewall portion 180 that is thicker than an upper sidewall portion 200.

The asphalt package 110 shown in FIG. 5 comprises container 220 and a body of asphalt 240 inside the container. The asphalt container may be any convenient shape, such as the rectangular solid shown in FIG. 5. The asphalt container may be molded with ribs 260 to provide strength to the container during the pouring and filling phase of packaging. As an alternative or in addition to internal strengthening ribs, external strengthening ribs may be provided to help avoid bulging during pouring or filling. Also, the container can have one or more recesses 280, which quicken the remelting process by enabling hot asphalt in a kettle to penetrate interior portions of the asphalt package. The recesses also speed up cooling after the molten asphalt is poured into containers. The recesses can be of any size or shape suitable for increasing heat transfer to or from the asphalt package.

It has been discovered that adding the polymer to traditional metal and paper asphalt packages is less than straightforward. In particular, it has been found that the introduction of polymer into the package prior to filling the package with molten asphalt often results in the polymer migrating to the top and sides of the package rather than becoming embedded in the asphalt. As a result, when the packaging materials are removed from the solidified asphalt at the construction site, a significant amount of the polymer separates from the asphalt and is thrown away with the packaging materials.

The present invention provides a method and apparatus for introducing the desired polymer into the asphalt contained in standard metal and paper packaging in a manner that the polymer is integrally bonded to the solidified asphalt contained in the package (hereinafter referred to as "packaged asphalt") such that it does not separate therefrom during removal of the packaging materials, yet it will separate from the asphalt upon melting in a kettle and float to the surface to form a fume-reducing skim.

In the method of the invention, the polymer pellets or polymer/asphalt composite pellets are combined with molten asphalt, such that the pellets are covered with molten asphalt, as they enter the package. This may be accomplished by injecting the pellets into a stream of molten asphalt as it is filling the package, or by introducing the asphalt and pellets into the package separately but simultaneously, such that the pellets are thoroughly coated with asphalt as they enter the package. As a result, although the pellets are typically less dense than the molten asphalt and tend to rise to the top of the package, the pellets are enveloped in the asphalt and have a much reduced tendency to separate from the asphalt upon removal of the package. Consequently, the package materials may be stripped from the packaged asphalt and thrown away without significantly reducing the amount of polymer that is added to the melting kettle with the packaged asphalt.

Other methods according to the invention can also be used to prevent the polymer from sticking to the bottom of the metal and paper container of a traditional asphalt package. For example, a release agent can be applied to the bottom of the container; optionally, the release agent can be blended or compounded into the polymer. A different coating can be used on the bottom of the container. The polymer can be encapsulated into a polymeric bag; the bag melts releasing the polymer into the asphalt and floats in the package, not sticking to the bottom of the container. The bag can be suspended in the middle of the package and hot asphalt poured over it; this prevents the polymer from ever coming into contact with the bottom of the container. A molded geometric piece can be used to hold the polymer inside the package (again, this would keep the polymer from the container bottom); the piece would have thin enough walls to melt and allow the polymer inside to be released and float in the asphalt. A polyolefin film liner (e.g., polypropylene) can be placed inside the package prior to the introduction of the polymer and asphalt to prevent the polymer from sticking to the container upon solidification of the asphalt. The liner would also provide additional polymer. Any of the above forms can also be added directly to any molten asphalt vessel as described above.

In addition to reducing fuming in the melting kettle, the incorporation of the polymer pellets or polymer/asphalt composite pellets into the formed asphalt packages may also reduce the fumes emanating from the packages during cooling. As the pellets contact the hot molten asphalt being introduced into the packages, the pellets begin to melt and, because of their lower density, float to the top of the package where they form a skim that reduces fuming as the packages cool. This beneficial attribute may be enhanced by including a small percentage of a polymer that has a high melt flow index or that is highly soluble in asphalt. For example, formulations including 60% asphalt and a combination of 38% polypropylene and 2% EVA; or 37% polypropylene having a melt flow index of from about 5 to about 50 grams/10 minutes and 3% polypropylene having a melt flow index of from about 50 to about 400 grams/10 minutes (measured at 230° C. under a 21.60 g. load), may ensure that a sufficient amount of polymer is melted during package filling to form the desired skim.

The invention will now be further illustrated by reference to the following examples.

EXAMPLE 1

Testing was conducted to measure the ability of a minor amount of asphalt/polymer composite pellets incorporated in a conventionally packaged asphalt product to reduce fuming from a kettle of the molten asphalt during remelting. In this test, fuming of a standard BURA Type III asphalt (Amoco roofer's flux asphalt air-blown to a softening point of from about 85° C. (185° F.) to about 96.1° C. (205° F.)), packaged in a conventional paper and metal container, was tested both with the added composite pellets ("low-fuming product"), and without the added polymer-containing pellets ("standard product").

The pellets added to the low-fuming product were prepared by pelletizing a mixture of asphalt air-blown to a softening point of about 143° C. (290° F.), polypropylene (Montel 6301 or Solvay Fortilene 12 melt flow index homopolymer), and ethylene-vinylacetate copolymer (Elvax 450) in a single screw extruder at a ratio of 60:30:10 by weight.

The equipment used for the testing included a 625-liter roofer's kettle heated by a propane burner. In the testing, the low-fuming product and the standard product were separately added to the kettle and melted to fill the kettle. The products were each tested at temperatures of 260° C. and 288° C. (500° F. and 550° F.), and the low-fuming products were tested at polymer concentrations ranging from 0.16 to 0.96 percent by weight of the total asphalt and polymer in the composition. To simulate actual usage conditions, 75.7 liters of molten product were drained from the kettle every 20 minutes and replaced by additional product added to the kettle. The testing was conducted outdoors, with the area around the kettle being surrounded to block the wind. The fumes emitted from the kettle were measured for visual opacity, and total suspended benzene soluble particulates as described below.

The test for visual opacity was performed in accordance with 40 C.F.R., Part 60, Appendix A, EPA Method 9, entitled "Visual Determination of the Opacity of Emission from Stationary Sources." A certified reader of opacity recorded the visual opacity every 15 seconds for two hours. The reader observed the fumes from the kettle and determined a percent opacity or blockage of the natural light. A low opacity indicates very little fumes, whereas a high opacity indicates a lot of fumes coming off the kettle. The results of the visual opacity readings are shown below in Table I, where the percent opacity is the average over the two-hour test:

TABLE I

Visual Opacity

| Weight %, Polymer | Temperature (°C.) | Opacity (%) |
|---|---|---|
| 0 (standard) | 260 | 18 |
| 0 (standard) | 288 | 19.5 |
| 0.08 | 260 | 16.6 |
| 0.08 | 288 | 26.9 |
| 0.16 | 260 | 11.4 |
| 0.16 | 288 | 16.9 |
| 0.32 | 260 | 10.1 |
| 0.32 | 288 | 9.4 |
| 0.48 | 260 | 5.1 |
| 0.48 | 288 | 5.3 |

The results of the visual opacity readings show that the low-fuming product had visibly lower fuming from the kettle than the standard product at polymer concentrations of 0.32 weight percent and above. Further, it was observed that at polymer loadings of 0.32 percent and above, the polymer of the low-fuming product formed a skim on substantially the entire upper surface of the molten asphalt.

The test for total benzene soluble suspended particulates was performed in accordance with the "Standard Operating Procedure: Benzene Solubles Method for Asphalt Institute Round Robin Study" which is a modified version of National Institute of Occupational Safety and Health (NIOSH) method 5023, 3rd edition. Two high-volume (Hi-Vol) TSP (total suspended particulates) samplers were elevated to position the sample inlets slightly above the kettle rim near the kettle opening. Each of the samplers pulled a stream of fumes from the kettle through a pre-weighed 1 ft² filter. Each sampler was operated for 2 hours. Thereafter, the filter elements were removed, covered with benzene (HPLC grade with evaporation residue of no greater than 0.0005%) and left for at least one hour. The benzene extract was then filtered in a Millipore Miliflex SR disposable filter under nitrogen pressure (approximately 7–10 psi). The benzene was then concentrated in a heater block at 85° C., transferred to pre-weighed cups, and placed in a vacuum oven at ambient temperature and 20–25 mm Hg vacuum overnight. The cups were then weighed to determine the amount of benzene soluble particulates. The results of the total benzene soluble suspended particulates measurements are shown below in Table II. The measurements are given in micrograms of particulates per standard cubic meter (scm) of fumes at standard conditions of one atmosphere pressure and 20° C.

TABLE II

Total Benzene Soluble Suspended Particulates

| | | Benzene Soluble Particulates μg/SCM | |
|---|---|---|---|
| Weight % Polymer | Temperature (° C.) | Sampler 1 | Sampler 2 |
| 0 (standard) | 260 | 943 | 1626 |
| 0 (standard) | 288 | 2463 | 3284 |
| 0.08 | 260 | 599 | 1663 |
| 0.08 | 288 | 3139 | 5187 |
| 0.16 | 260 | — | — |
| 0.16 | 288 | — | — |
| 0.32 | 260 | 304 | 615 |
| 0.32 | 288 | 236 | 1465 |
| 0.48 | 260 | 443 | 553 |
| 0.48 | 288 | 301 | 1530 |

These results, like the visual opacity results, show that the low-fuming product reduced the amount of fumes from the kettle compared to the standard product. The benzene soluble particulates were consistently lower for the low-fuming product versus the standard product at polymer levels greater than 0.32%.

EXAMPLE 2

The benzene soluble particulates emitted were measured for 16 additional samples of standard product and low fuming product having 0.32 weight percent polymer. The results are shown below in Table III.

TABLE III

Total Benzene Soluble Suspended Particulates

| Weight % Polymer | Temperature | Benzene Soluble Particulates (μg/SCM) |
|---|---|---|
| 0 | 260 | 2377 |
| 0 | 260 | 3306 |
| 0 | 260 | 1861 |
| 0 | 260 | 2132 |
| 0 | 260 | 2519 |
| 0 | 260 | 1652 |
| 0 | 260 | 5833 |
| 0 | 260 | 2702 |
| 0 | 288 | 3292 |
| 0 | 288 | 3756 |
| 0 | 288 | 5633 |
| 0 | 288 | 3507 |
| 0 | 288 | 5809 |
| 0 | 288 | 4103 |
| 0 | 288 | 18854 |
| 0 | 288 | 12808 |
| 0.32 | 260 | 768 |
| 0.32 | 260 | 687 |
| 0.32 | 260 | 38 |
| 0.32 | 260 | 535 |
| 0.32 | 260 | 116 |
| 0.32 | 260 | 129 |
| 0.32 | 260 | 106 |
| 0.32 | 260 | 194 |
| 0.32 | 288 | 415 |
| 0.32 | 288 | 636 |
| 0.32 | 288 | 387 |
| 0.32 | 288 | 522 |
| 0.32 | 288 | 165 |
| 0.32 | 288 | 429 |
| 0.32 | 288 | 118 |
| 0.32 | 288 | 485 |

These results show that the benzene soluble particulates are also lower at 0.32% polymer than for the standard product.

EXAMPLE 3

A supply of molten asphalt is transported in a tanker truck to an end user, who places a quantity in a roofer's kettle for heating to a temperature suitable for application as roofing asphalt. The end user is supplied with meltable polymeric bags, each of which encapsulates a plurality of polymer/asphalt composite pellets. The end user periodically throws a bag into the kettle, where it melts and releases the pellets.

The polymer from the pellets and the bag forms a skim on the surface of the molten asphalt that reduces fuming from the kettle.

EXAMPLE 4

A consumable container for asphalt was formed according to the following low-fuming method. Amoco AC-20 asphalt air-blown to a softening point of 121° C., polypropylene (Profax 6301), and ethylene-vinyl acetate copolymer (Elvax 450) were pelletized in a twin screw extruder at a ratio of 60:30:10 by weight. The screw temperature was set at 177° C. The pellets were used to injection-mold a consumable container as illustrated in FIG. 1. The container had a melt flow index of about 46.6 grams/10 minutes. The container was tough and impact-resistant, having an unnotched Izod impact strength of 4.5 joules, a tensile strength of 95.5 kg/cm2 at 22° C., a tensile strength of 25.3 kg/cm2 at 93° C., and a tensile modulus of 336 kg/cm2 at 93° C.

After molding, the container was filled with a BURA Type III roofing asphalt at a temperature of 166° C. The container did not significantly bulge or deform, and thermocouples on the exterior of the container did not exceed 113° C. The asphalt package (the container and the asphalt held in the container) weighed 27.24 kg when full (0.91 kg container and 26.33 kg asphalt). The asphalt package met the requirements for Type III roofing asphalt according to ASTM D312.

The container can be melted right along with the asphalt held in the container without significantly changing the properties of the asphalt. The softening point of the asphalt alone was 89° C., and the softening point of the combined asphalt and container was 95° C. The asphalt alone had a penetration of 19 dmm at 25° C., and the combined asphalt and container had a penetration of 17 dmm at 25° C.

EXAMPLE 5

Montel Polypropylene 6301 and coating asphalt having a softening point of 230° F. (110° C.) were pelletized in a twin screw extruder at a ratio of 30:70 by weight. The screw temperature was set at 350° F. (177° C.). The pellets were used to injection-mold containers in the shape of a tray with dimensions of 10 inches×13 inches×3.5 inches (25.4 cm×33.0 cm×8.9 cm), and a thickness of 100 mil. Several of the molded asphalt containers were added to a body of molten BURA Type III asphalt. The weight of the containers was 4 percent of the total weight of the asphalt and containers. The properties of the asphalt before and after addition of the containers were measured, with the results given in the table below along with the ASTM D312 Type III specifications for comparison.

TABLE IV

Effects of the Addition of Molded Containers to Molten Asphalt

| Property | BURA Type III Asphalt Alone | Asphalt + 4 wt. % Container | ASTM D312 Type III spec. |
|---|---|---|---|
| Softening pt. | 192° F. (89° C.) | 204° F. (96° C.) | 185–205° F. (85–96° C.) |
| Penetration @ 77° F., 100 g | 19 dmm | 16 dmm | 15–35 dmm |
| Penetration @ 115° F., 50 g | 37 dmm | 29 dmm | 90 dmm max. |
| Viscosity @ 400° F. | 140 cps | 254 cps | — |
| Viscosity @ 425° F. | 91 cps | 150 cps | — |
| Viscosity @ 450° F. | 64 cps | 95 cps | — |

It can be seen that the addition of the container to the asphalt had only a slight effect on the properties of the asphalt, with the most pronounced change being the increased viscosity.

EXAMPLE 6

Montel Polypropylene 6301, a highly blown asphalt, and BURA Type III asphalt were pelletized in a twin screw extruder at a ratio of 40:20:40 by weight. The highly blown asphalt was a Trumbull material from a propane-washed asphalt blend having been blown to a softening point of 300° F. (149° C.). The screw temperature was set at 350° F. (177° C.). The pellets were used to injection-mold a container that was 8 inches in diameter and 7.5 inches high, and 90 mil thick. After molding, the container was filled with 350° F. (149° C.) asphalt. The container did not bulge or deform. Temperature readings on thermocouples placed on the exterior never exceeded 160° F. (71° C.). The asphalt package of the container and the asphalt therein weighed 10 lbs. when full. The container was lowered in a wire basket into a roofer's asphalt kettle containing molten asphalt at 475° F. (246° C.). Without stirring, the package was completely dissolved by natural convection without any visible trace within 15 minutes. The properties of the asphalt before and after addition of the containers were measured, with the results given in the table below in comparison with the ASTM D312 Type III specifications.

TABLE V

Effects of the Addition of Asphalt-Filled, Molded Containers to Molten Asphalt

| Property | BURA Type III Asphalt Alone | Asphalt + 4 wt. % Container | ASTM D312 Type III spec. |
|---|---|---|---|
| Softening pt. | 192° F. (89° C.) | 207° F. (97° C.) | 185–205° F. (85–96° C.) |
| Penetration @ 77° F., 100 g | 19 dmm | 17 dmm | 15–35 dmm |
| Penetration @ 115° F., 50 g | 37 dmm | 29 dmm | 90 dmm max. |
| Viscosity @ 400° F. | 140 cps | 254 cps | — |
| Viscosity @ 425° F. | 91 cps | 150 cps | — |
| Viscosity @ 450° F. | 64 cps | 95 cps | — |

The results are similar to those in Example 5. The softening point of the asphalt having the melted container was slightly above the Type III specification.

Although the invention has been described in detail in reference to preferred feature and embodiments, appropriate modifications will be apparent to the artisan. Thus, the invention is intended not to be limited by the foregoing description, but to be defined by the appended claims and their equivalents.

What is claimed is:

1. In a method of melting asphalt in which an amount of unmelted asphalt is placed into a vessel and heated to melt the asphalt, the molten asphalt normally emitting fumes from the vessel, the improvement comprising: adding about 0.2 weight percent to about 6 weight percent of a polymer to the asphalt to reduce the visual opacity of the fumes by at least about 25% with respect to the same asphalt without the polymer.

2. The method of claim 1, wherein the added polymer forms a skim on the upper surface of the molten asphalt.

3. The method of claim 2, wherein the polymer has a melt flow index of from about 15 grams/10 minutes to about 95 grams/10 minutes.

4. The method of claim 1, wherein the polymer is added in the form of a consumable container holding the amount of unmelted asphalt, the container made from a material comprising from about 40 weight percent to about 90 weight percent of an asphalt and from about 10 weight percent to about 60 weight percent of the polymer.

5. The method of claim 1, wherein both the asphalt without the polymer and the asphalt with the added polymer meet the requirements for at least one type of roofing asphalt according to ASTM D312.

6. The method of claim 1, wherein the addition of the polymer to the molten asphalt neither changes the softening point of the asphalt by more than about 9° C. nor changes the penetration of the asphalt by more than about 10 dmm at 25° C.

7. The method of claim 1, wherein the polymer is selected from the group consisting of polypropylene, ethylene-vinyl acetate copolymer having a vinyl acetate content of from about 5 weight percent to about 40 weight percent, ethylene-methyl acrylate copolymers, rubber, and mixtures thereof.

8. The method of claim 1, wherein the polymer is added in the form of pellets.

9. The method of claim 1, wherein the polymer is contained within a polymeric bag which is added to the asphalt.

10. The method of claim 1, wherein the polymer is added in the form of a solidified mixture of polymer and asphalt.

11. The method of claim 1, wherein the polymer is contained within a polymeric bag inside an asphalt package, with the package being added to the asphalt.

12. In a method of melting asphalt in which an amount of unmelted asphalt is placed into a vessel and heated to melt the asphalt, the molten asphalt normally emitting fumes from the vessel, the improvement comprising: adding from about 0.2 weight percent to about 6 weight percent of a polymer to the asphalt to reduce the total emissions of benzene soluble suspended particulates by at least about 15% over the same asphalt without the polymer.

13. The method of claim 12, wherein the added polymer forms a skim on the upper surface of the molten asphalt.

14. The method of claim 13, wherein the polymer has a melt flow index of from about 15 grams/10 minutes to about 95 grams/10 minutes.

15. The method of claim 12, wherein the polymer is added in the form of a consumable container containing the amount of unmelted asphalt, the container made from a material comprising from about 40 weight percent to about 90 weight percent of an asphalt and from about 10 weight percent to about 60 weight percent of the polymer.

16. The method of claim 12, wherein the polymer is added in the form of pellets.

17. The method of claim 12, wherein the polymer is contained within a polymeric bag which is added to the asphalt.

18. The method of claim 12, wherein the polymer is added in the form of a solidified mixture of polymer and asphalt.

19. In a method of melting asphalt in which an amount of unmelted asphalt is placed into a vessel and heated to melt the asphalt, the molten asphalt normally emitting fumes from the vessel, the improvement comprising: adding about 0.2 weight percent to about 6 weight percent of a polymer having a melt flow index of from about 15 grams/10 minutes to about 95 grams/10 minutes to the asphalt, the added polymer forming a skim on the upper surface of the molten asphalt that reduces the visual opacity of the fumes by at least about 25% with respect to the same asphalt without the polymer.

20. In a method of holding asphalt in which an amount of molten asphalt is contained in a vessel, the molten asphalt normally emitting fumes from the vessel, the improvement comprising: adding about 0.2 weight percent to about 6 weight percent of a polymer to the asphalt to reduce the visual opacity of the fumes by at least about 25% with respect to the same asphalt without the polymer.

21. The method of claim 20 in which the asphalt is added to the vessel in molten form.

22. The method of claim 20, wherein the added polymer forms a skim on the upper surface of the molten asphalt.

23. The method of claim 20, wherein the polymer has a melt flow index of from about 15 grams/10 minutes to about 95 grams/10 minutes.

24. The method of claim 20, wherein both the asphalt without the polymer and the asphalt with the added polymer meet the requirements for at least one type of roofing asphalt according to ASTM D312.

25. The method of claim 20, wherein the addition of the polymer to the molten asphalt neither changes the softening point of the asphalt by more than about 9° C. nor changes the penetration of the asphalt by more than about 10 dmm at 25° C.

26. The method of claim 20, wherein the polymer is contained within a polymeric bag which is added to the asphalt.

27. The method of claim 20, wherein the polymer is selected from the group consisting of polypropylene, ethylene-vinyl acetate copolymer having a vinyl acetate content of from about 5 weight percent to about 40 weight percent, ethylene-methyl acrylate copolymers, rubber, and mixtures thereof.

28. The method of claim 27 in which the asphalt is added to the vessel in molten form, in which the added polymer forms a skim on the upper surface of the molten asphalt, in which the polymer has a melt flow index of from about 15 grams/10 minutes to about 95 grams/10 minutes.

* * * * *